US008786140B2

(12) United States Patent
Kay et al.

(10) Patent No.: US 8,786,140 B2
(45) Date of Patent: Jul. 22, 2014

(54) HIGH EFFICIENCY MAGNETOHYDRODYNAMIC POWER GENERATION USING ULTRA-HIGH MAGNETIC FIELDS AND NOVEL COOLING

(76) Inventors: Thomas P. Kay, Woodstock, NY (US); Douglas B. Chrisey, Niskayuna, NY (US); Yoav Peles, Loudonville, NY (US)

(*) Notice: Subject to any disclaimer, the term of this patent is extended or adjusted under 35 U.S.C. 154(b) by 316 days.

(21) Appl. No.: 13/039,693

(22) Filed: Mar. 3, 2011

(65) Prior Publication Data
US 2011/0241448 A1 Oct. 6, 2011

Related U.S. Application Data

(60) Provisional application No. 61/310,876, filed on Mar. 5, 2010.

(51) Int. Cl.
*H02K 44/16* (2006.01)
*F03G 6/00* (2006.01)
*H01F 6/02* (2006.01)
*F04D 7/00* (2006.01)
*H02K 44/08* (2006.01)

(52) U.S. Cl.
CPC .................. *H02K 44/085* (2013.01)
USPC ............... 310/11; 60/641.8; 335/216; 417/50

(58) Field of Classification Search
CPC ............................ H02K 44/00; H02K 44/08
USPC .................... 310/11; 322/7; 417/50; 335/216
See application file for complete search history.

(56) References Cited

U.S. PATENT DOCUMENTS

| | | | | | |
|---|---|---|---|---|---|
| 3,740,593 | A | * | 6/1973 | Zar ................................. | 310/11 |
| 4,300,512 | A | * | 11/1981 | Franz ............................ | 123/536 |
| 4,450,361 | A | * | 5/1984 | Holt .............................. | 290/1 R |
| 2007/0139881 | A1 | * | 6/2007 | Ouyang ........................ | 361/689 |
| 2010/0275616 | A1 | * | 11/2010 | Saji et al. ............................ | 62/6 |

FOREIGN PATENT DOCUMENTS

JP 46005625 A * 3/1971

* cited by examiner

*Primary Examiner* — Tran Nguyen
*Assistant Examiner* — Jose Gonzalez Quinones
(74) *Attorney, Agent, or Firm* — Levine Mandelbaum PLLC

(57) ABSTRACT

A magnetohydrodynamic energy conversion device with an electrically conductive working fluid flowing through a conduit in a magnetic field has permanent magnets aligned for maximum field density for inducing an electric current in the fluid and a multistage cooling system for cryogenically cooling the magnets whereby heat is removed from the device at successive cooling stages having respective different coolants, e.g., water, liquid nitrogen and liquid helium, to maintain the magnets at temperatures low enough to produce high tesla magnetic flux densities in the presence of a high temperature working fluid.

17 Claims, 3 Drawing Sheets

HIGH EFFICIENCY MAGNETOHYDRODYNAMIC POWER GENERATION USING ULTRA-HIGH MAGNETIC FIELDS AND NOVEL COOLING

BACKGROUND OF THE INVENTION

This invention relates to magnetohydrodynamic (MHD) energy conversion devices, i.e., energy conversion devices capable of converting heat directly into electrical energy.

As is known in the art, electricity can be produced in a MHD (magnetohydrodynamic) energy conversion device wherein a working fluid in the nature of a plasma, i.e., an electrically-conductive ionized gas flows through a magnetic field perpendicular to the direction of plasma flow. This action generates an electric current in the ionized gas which can be tapped by electrodes located in the magnetic field and in contact with the moving plasma. The stronger the magnetic field and the higher the temperature and velocity of the ionized gas, the greater is the relative amount of electricity that can be extracted from the MHD energy conversion device. Examples of MHD devices used to convert solar and laser energy into electricity are illustrated and described in U.S. Pat. Nos. 4,191,901 and 4,275,318.

Electromagnets have proven impractical for use in MHD energy conversion devices because they require electricity to stay cool in order to sustain high magnetic flux densities necessary for efficient production of electrical energy. Prior art MHD energy conversion devices have been limited to the use of magnets having magnetic flux densities of no greater then 1-2 tesla which has made such energy conversion devices unsuitable for use in electric power generation for residential, remote, portable, commercial and industrial applications.

SUMMARY OF THE INVENTION

The present invention provides for a high efficiency MHD energy conversion device which utilizes flux trapped in superconductors as permanent magnets having magnetic flux densities of up to 17 tesla, and multistage cooling systems which employ coolants, including liquids with cryogenic properties such as liquid helium and liquid nitrogen. An electrically conductive fluid, in the form of an ionized gas or plasma, flows through an electrically conductive fluid conduit in a magnetic field produced by the pole pieces of two permanent magnets aligned for maximum field density for inducing an electric current in the fluid by separating the positive charges from the negative charges. As used herein, the reference to "permanent magnets" includes superconductors having trapped flux as opposed to electromagnets in which a current is passed through a coil surrounding a ferromagnetic core.

Each permanent magnet is disposed in a chamber containing a cryogenic liquid, e.g., helium, which has been circulated from the chamber through a heat exchanger, releasing the heat absorbed within the chamber before being pumped back into the chamber.

The chamber containing each permanent magnet is sandwiched between two dewar vacuum containers in contact with the cooling chambers of two respective liquid nitrogen cooling systems. Other cryogenic liquids having similar cooling properties may be substituted for nitrogen. Each cooling chamber of one of a pair of inner liquid nitrogen cooling systems is separated from the cooling chamber of a respective microchannel water cooling chamber by another dewar vacuum container. Each microchannel water cooling chamber absorbs heat from a contacting radiation shield proximate the conductive fluid conduit. The foregoing arrangement enables the permanent magnets to operate at cryogenic temperatures in the presence of an electrically conductive working fluid having temperatures as high as 3,000 degrees centigrade for reaching magnetic flux densities of up to 17 tesla substantially increasing the efficiency of the MHD energy conversion device. Cryogenic temperatures below 4.2 degrees Kelvin are possible.

DESCRIPTIONS OF THE DRAWINGS

DESCRIPTION OF THE PREFERRED EMBODIMENT

Figure 1:
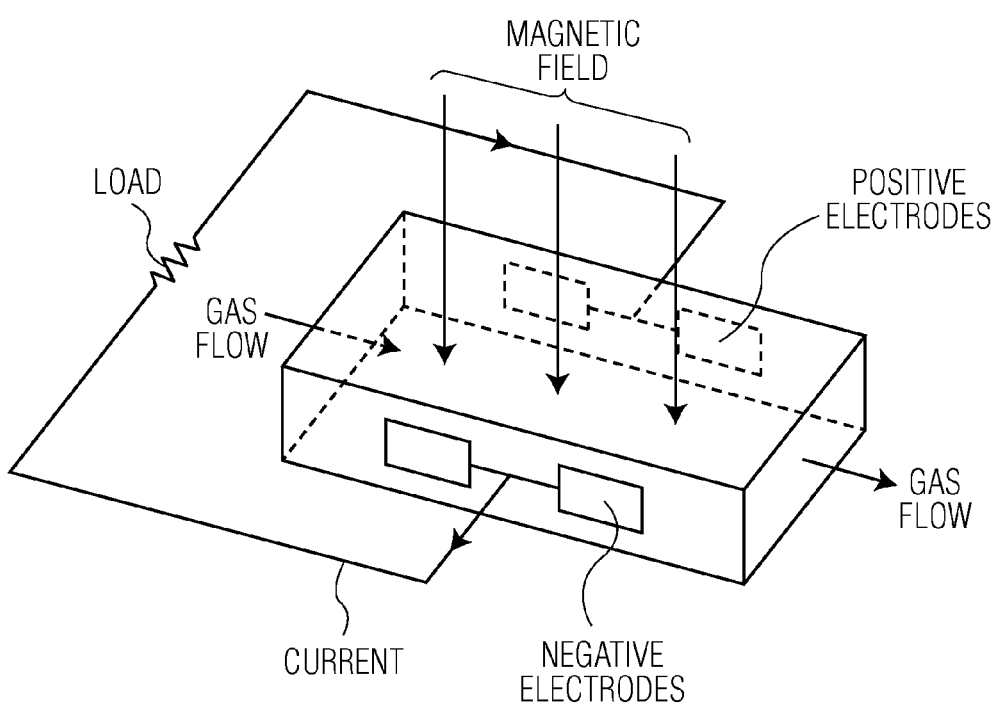
FIG. 1 is a perspective schematic view a basic prior art magnetohydrodynamic (MHD) energy device.

Referring now to FIG. 1 of the drawings, there is shown a basic MHD Energy conversion device known in the prior art. A working fluid in the nature of a plasma or gas is propelled through a nozzle (not shown) to accelerate the fluid, and then into a conduit situated within a magnetic field provided by magnets (not shown) above and below the conduit.

A current transverse to the magnetic field and the direction of flow of the working fluid is tapped by electrodes mounted on opposite sides of the conduit in a plane transverse to the magnetic field. A load can be connected across the electrodes for receiving an electric output current from the MHD.

Figure 2A:
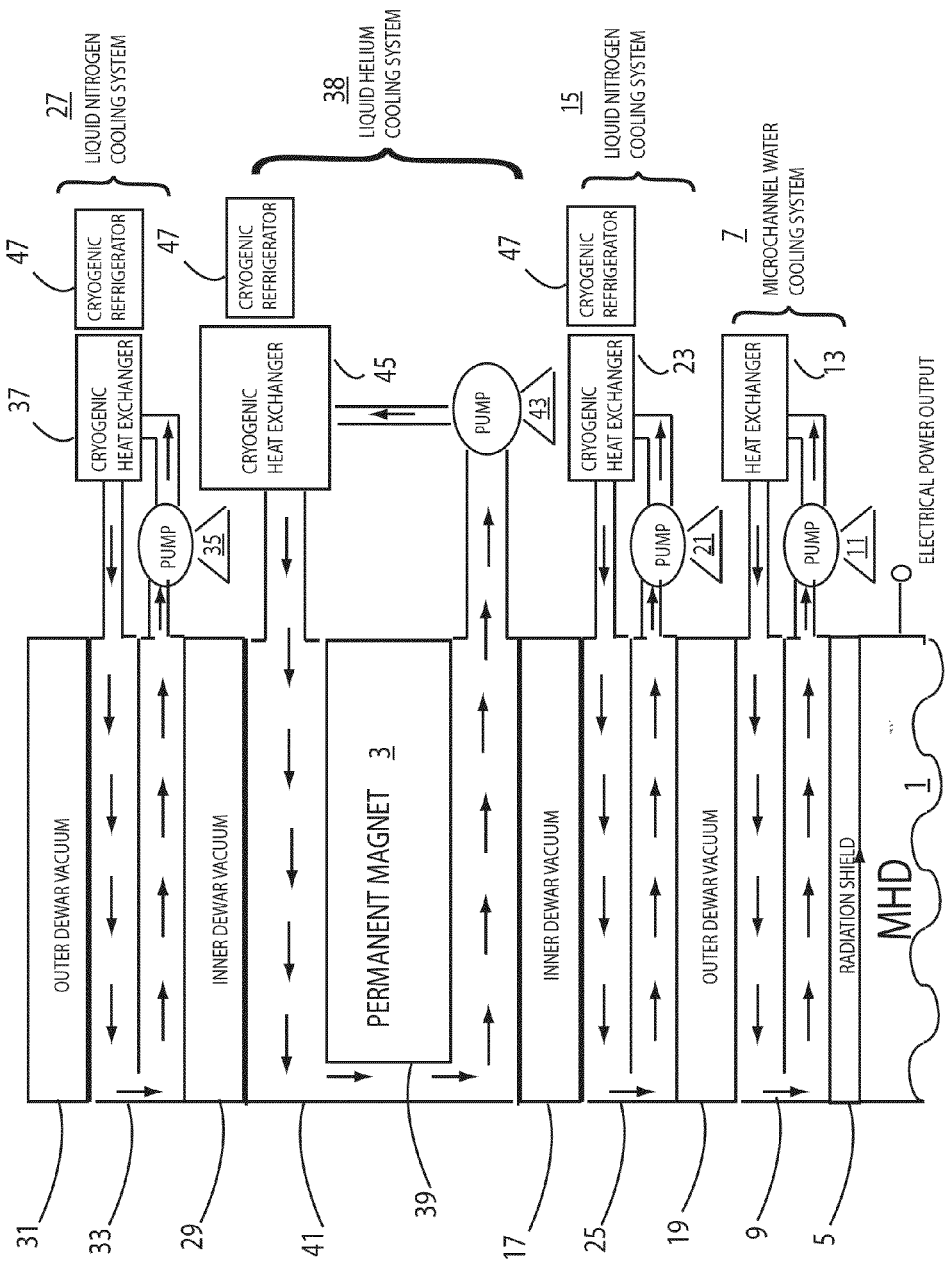
FIG. 2A is a fragmented schematic diagram of an upper portion of an MHD energy conversion device in accordance with the invention.
Figure 2B:
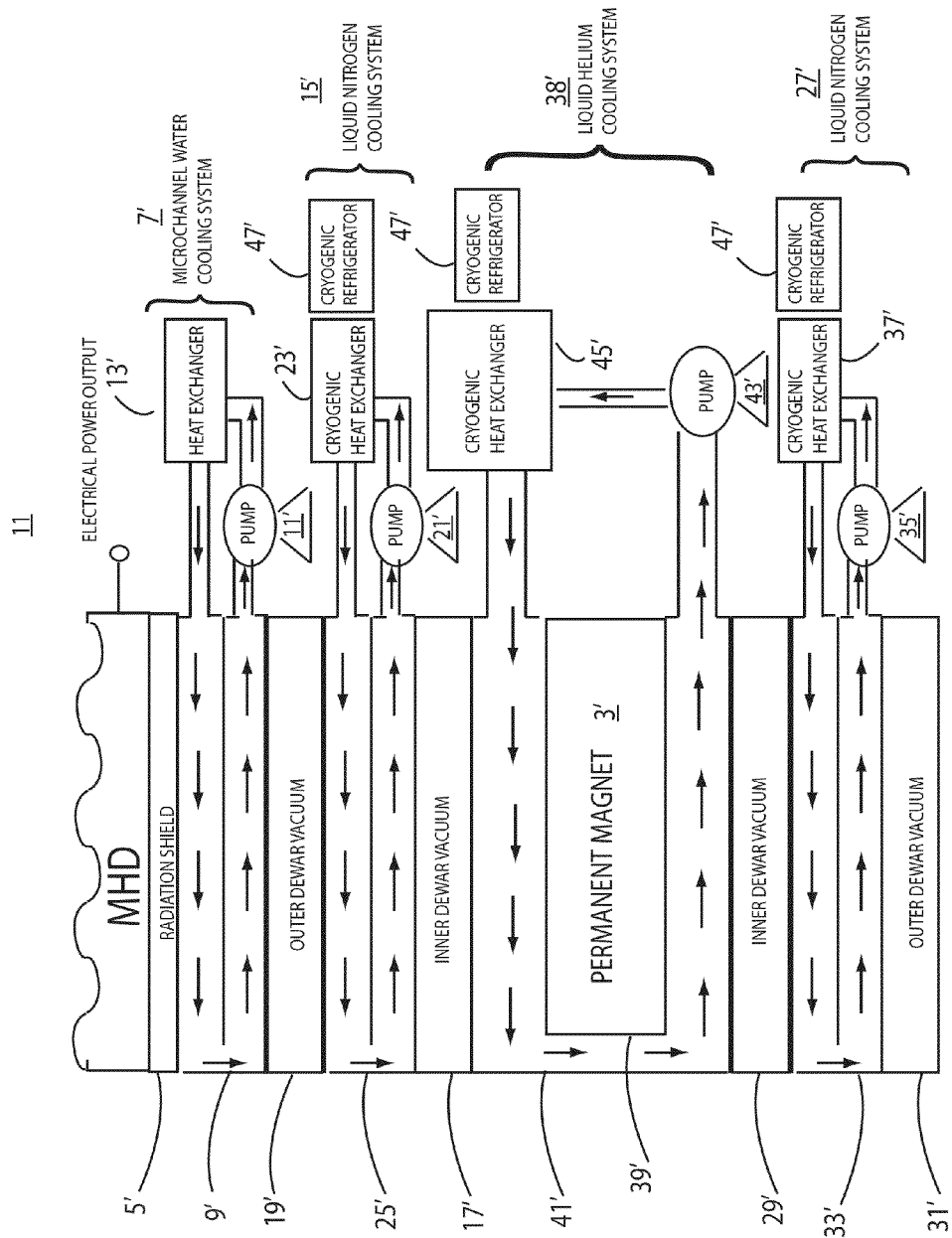
FIG. 2B is a fragmented schematic diagram of a lower portion of the MHD energy conversion device of FIG. 2A.

Referring now to FIGS. 2A and 2B of the drawings there is shown an MHD energy conversion device which includes a conduit 1 for an electrically-conductive ionized gas (not shown) which is heated, e.g., by solar energy, and flows through a magnetic field provided by permanent magnets 3, 3' disposed on opposite sides of the MHD energy conversion device in a direction parallel to a longitudinal axis of the conduit 1. In the preferred embodiment of the invention, the magnets 3, 3' form an ellipse with the MHD energy conversion device passing through the center of the ellipse.

For simplicity the invention has been illustrated in FIGS. 2 and 2B with one magnet 3, 3' on each side of the MHD conduit 1 to provide a magnetic field intersecting the electrically conductive fluid conduit axis for inducing an electric current in said fluid. However, it is to be appreciated that multiple magnets may be provided on either side of the MHD energy conversion device. A pair of electrodes (not shown) are arranged on opposite sides of the electrically conductive fluid conduit 1 in a plane transverse to a plane of the magnetic field and adapted to be connected for applying a voltage to a load.

The magnets 3, 3' should be placed as close as possible to the high temperature MHD working fluid (plasma) conduit in order to provide the strongest possible magnetic field and, therefore, the greatest electrical output.

The magnets 3, 3' can be formed from specially treated rare earth superconductors like those developed by a company named Magnifye in Cambridge, England. In order to produce magnetic flux densities of as much as 17 tesla, these magnets can be cooled to cryogenic temperatures. The MHD energy conversion device which is operated in the magnetic field produced by these magnets employs a plasma working fluid with operating temperatures of about 3,000 degrees centigrade. The present invention solves the problem of employing magnets operating at cryogenic temperatures, e.g., below 4.2 degree Kelvin, and an MHD energy conversion device with a working fluid at about 3,000 degrees centigrade in close proximity, in the same apparatus, for achieving the efficiencies that can be obtained with magnets having flux densities as high as 17 tesla.

Due to the high levels of heat convection and radiation from the MHD plasma and the very low thermal capacity of the permanent magnets at operating temperatures (magnet performance deteriorates at elevated temperatures) staged radiation shielding incorporating multiple cooling systems is provided between the MHD energy conversion device and magnets.

Radiation shields 5, 5' are provided between the MHD conduit 1 and each of the magnets 3, 3'. Each radiation shield 2, 2' has an outer reflective surface and a black body inside. The radiation shields 5, 5' are preferably fabricated from a highly reflective material that is transparent to a magnetic field, for example, an electropolished nonmagnetic metal.

The conduit walls and the radiation shields 5, 5' are cooled by microchannel water cooling systems 7, 7' in which cooling water, a liquid at ambient temperature and pressure, is circulated through a channel 9, 9' in housings having chambers disposed between the radiation shields 5, 5' and magnets 8, 8' to provide local cooling. Other coolants may be substituted for water as will be known to those skilled in the art. Heat transfer coefficient is inversely proportional to the diameters of the cooling channels. Hence, microchannels having diameters as small as possible are employed to maintain the conduit walls at temperatures low enough to preserve the structural integrity of the system.

The microchannel cooling water is circulated by pumps 11, 11' through heat exchangers 13, 13' for dissipating the heat absorbed from the conduit's walls and the residual heat absorbed from the radiation shields 5, 5' into the ambient environment. The microchannel water cooling systems can reduce the heat transfer from the MHD plasma chamber, which operates at approximately 2,000 degrees centigrade, into the rest of the magnet packaging 19, 25, 17, 39, 41, 29, 33, 31, 19', 25', 17', 39', 41', 29', 33', 31' and maintain a temperatures of less than 100 degrees centigrade.

Although water is used for microchannel cooling due to its desirable thermal properties, other liquids can be used for microchannel cooling adjacent the radiation shields 5, 5'.

Disposed between each permanent magnet 3, 3' and the microchannel cooling systems is a cryogenic liquid nitrogen cooling system 15, 15' formed between dewar vacuum containers 17, 17' for inner dewar vacuums and dewar vacuum containers 19, 19' for outer dewar vacuums. Disposed between, and in contact with adjacent walls of the containers 17, 17' and 19, 19' are housings 25, 25' having chambers through which liquid nitrogen is circulated from pumps 21, 21' to cryogenic heat exchangers 23, 23' where heat absorbed in the chambers of the housings 25, 25' by the liquid nitrogen is expelled to the ambient environment. The liquid nitrogen continuously reenters the pumps 21, 21' and is circulated through the chambers of the housings 25, 25' to the heat exchangers 23, 23' to remove heat transferred from the MHD energy conversion device through the conduit walls and radiation shields 5, 5'. The liquid nitrogen can reduce the temperatures of the components into which it comes in contact to approximately 77 degrees Kelvin.

Cryogenic liquid nitrogen cooling systems 27, 27' similar to the ones between the dewar vacuum containers 19, 19' and 17, 17' including pumps 21, 21', conduit 25, 25' and cryogenic heat exchanger 23, 23' are provided between the magnets 3, 3' and the ambient environment in order to dissipate the heat transferred from the ambient environment into the magnets 3, 3' and sustain the low temperatures at which the magnets 3, 3' must be maintained to provide high magnetic flux densities of as much as 17 tesla. These liquid nitrogen cooling systems are disposed between containers 29, 29' for inner dewar vacuums and containers 31, 31' for outer dewar vacuums.

Sandwiched between adjacent walls of the containers 29, 29' and 31, 31' are housings 33, 33' having chambers through which liquid nitrogen is pumped from pumps 35, 35' to cryogenic heat exchangers 37, 37' which transfer heat absorbed by the liquid nitrogen to the ambient environment through a cryogenic refrigerator. The liquid nitrogen continuously reenters the pumps 35, 35' and is cycled back into the heat exchangers 37, 37' to minimize the heat transfer from the ambient environment to the magnets.

Primary cooling of the magnets 3, 3' from the approximately 77 degrees Kelvin achievable by the liquid nitrogen cooling systems to the desired magnet operating temperature of less than 4.2 degrees Kelvin is achieved by liquid helium cooling systems 38, 38' in which liquid helium is circulated by pumps 43, 43' around the magnets 3, 3'. For this purpose the magnets 3, 3' are disposed in respective chambers 39, 39' in housings 41, 41' having inlets and outlets connected to pumps 43, 43' and cryogenic heat exchangers 45, 45'. Liquid helium is pumped through the heat exchangers 45, 45' into the chambers 39, 39' and back into the pumps 43, 43' thereby maintaining the permanent magnets 3, 3' at cryogenic operating temperatures, e.g. 4.2 degrees Kelvin and below.

The MHD energy conversion device of the invention provides an effective solution to the problem of converting heat and, in particular, solar energy to electricity. Moreover, the MHD energy conversion device of the invention is scalable and can be constructed in various sizes depending on energy and space requirements. For example, a micro version of the MHD energy conversion device of the invention it could be placed at the focal point of a parabolic solar collector or any type of concentrating solar collector.

It is to be appreciated that the foregoing is a description of a preferred embodiment of the invention to which alterations and modifications may be made without departing from the spirit and scope of the invention. For example, each of the cryogenic heat exchangers 23, 23', 37, 37'. 45.45' can be provided with a cryogenic refrigerator 47, 47' to enhance the removal of heat from the respective cooling systems or cryogenic refrigerators can be substituted for one or more respective cryogenic cooling systems to cool the respective magnets.

What is claimed is:

1. A high efficiency magnetohydrodynamic energy conversion device comprising
   an electrically conductive fluid,
   an electrically conductive fluid conduit having an axis, said electrically conductive fluid flowing through said electrically conductive fluid conduit under pressure in a direction parallel to said axis,
   first and second permanent magnets aligned for forming a magnetic field intersecting said electrically conductive fluid conduit axis for inducing an electric current in said fluid, the magnitude of said current increasing in response to an increase in the temperature of said fluid, and
   first and second cooling means for respectively cooling said first and second permanent magnets,
   said first cooling means comprising a plurality of cooling systems disposed between said electrically conductive fluid conduit and said first permanent magnet, and each of said cooling systems comprises a housing with a cooling chamber, a heat exchanger, and a pump for circulating a coolant between said cooling chamber and said heat exchanger whereby said coolant absorbs heat within said cooling chamber and expels heat through said heat exchanger, said first permanent magnet being disposed within the housing of a first one of said cooling systems for enabling the coolant in said first one of said cooling systems to be circulated about said first permanent magnet, the coolant in said first one of said cooling systems having a composition different from the coolant in a second one of said cooling systems, the coolant in a third one of said cooling systems having a composition different from the coolants in said first one of said cooling systems and said second one of said cooling systems.

2. A magnetohydrodynamic energy conversion device according to claim 1 wherein the coolant in said first one of said cooling systems comprises helium.

3. A magnetohydrodynamic energy conversion device according to claim 1 wherein the coolant in said second one of said cooling systems comprises water.

4. A magnetohydrodynamic energy conversion device according to claim 1 wherein said third one of said cooling systems is disposed between said first one of said cooling systems and said second one of said cooling systems.

5. A magnetohydrodynamic energy conversion device according to claim 1 wherein the coolant in said third one of said cooling systems comprises nitrogen.

6. A magnetohydrodynamic energy conversion device according to claim 1 further comprising at least one container of a vacuum disposed between a cooling chamber of one of said cooling systems and a cooling chamber of another of said cooling systems.

7. A magnetohydrodynamic energy conversion device according to claim 1 wherein at least one of said first and second staged cooling means comprises a radiation shield disposed between said electrically conductive fluid conduit and said first permanent magnet.

8. A magnetohydrodynamic energy conversion device according to claim 1 wherein said one of said permanent magnets is maintained at temperatures below 4.2 degrees Kelvin.

9. In a magnetohydrodynamic energy conversion device having an electrically conductive fluid flowing through an electrically conductive fluid conduit, first and second permanent magnets aligned for forming a magnetic field intersecting said electrically conductive fluid conduit axis for inducing an electric current in said fluid, the improvement wherein each of said first and second magnets is a permanent magnet and, for cryogenically cooling each of said magnets said magnetohydrodynamic energy conversion device comprises, a housing having a chamber in which one of said permanent magnets is disposed, said chamber containing a cryogenic liquid surrounding and cooling said one of said permanent magnets, a heat exchanger external to said chamber for allowing heat absorbed by said cryogenic liquid to escape to the ambient atmosphere, and a pump for circulating between said chamber and said heat exchanger said cryogenic liquid, a container having a vacuum and a first wall mounted adjacent said housing for insulating said chamber from heat, and a nitrogen cooing system for further cooling said one of said permanent magnets comprising, connected in series, a liquid nitrogen chamber in a housing mounted adjacent a second wall of said container having a vacuum opposite said first wall, a liquid nitrogen heat exchanger, and a liquid nitrogen pump for pumping liquid nitrogen through said liquid nitrogen chamber and said liquid nitrogen heat exchanger whereby heat absorbed by said liquid nitrogen can be released to the ambient atmosphere.

10. An improved magnetohydrodynamic energy conversion device according to claim 9 further comprising a water cooling system for further cooling said one of said permanent magnets comprising, connected in series, a microchannel water cooling chamber in a housing disposed adjacent said liquid nitrogen chamber, a water heat exchanger, and a water pump for pumping said water through said microchannel water cooling chamber and said water heat exchanger whereby heat absorbed by said water can be released to the ambient atmosphere.

11. An improved magnetohydrodynamic energy conversion device according to claim 10 further comprising a vacuum container disposed between said microchannel water cooling chamber and said liquid nitrogen chamber.

12. An improved magnetohydrodynamic energy conversion device according to claim 10 further comprising a radiation shield mounted adjacent said microchannel water cooling chamber.

13. An improved magnetohydrodynamic energy conversion device according to claim 1 wherein said cooling means comprises a cryogenic refrigerator.

14. A method of maximizing electrical output from a magnetohydrodynamic energy conversion device having an electrically conductive fluid flowing through a conduit under pressure and first and second permanent magnets aligned for forming a magnetic field intersecting said conduit for inducing an electric current in said fluid comprising, cooling said conduit by providing a microchannel water chamber adjacent thereto to remove heat from said conduit, and cooling at least one of said magnets by circulating a cryogenic liquid between a chamber in which said magnet is disposed and a heat exchanger external to said chamber for allowing heat absorbed by said cryogenic liquid to escape to the ambient atmosphere, said cryogenic liquid surrounding and cooling said magnet in said chamber.

15. A method of maximizing electrical output from a magnetohydrodynamic energy conversion device according to claim 14 further comprising providing said heat exchanger with a cryogenic refrigerator for cooling the air surrounding said heat exchanger.

16. A magnetohydrodynamic energy conversion device according to claim 1 wherein said first and second magnets are free of electrical connection to any source of electric power.

17. A method of maximizing electrical output from a magnetohydrodynamic energy conversion device according to claim 14 wherein said first and second magnets are free of electrical connection to any source of electric power.

* * * * *